Dec. 31, 1963  E. B. FOX  3,115,951
PRESSURE RESPONSIVE SAFETY CONTROL FOR
INTERNAL COMBUSTION ENGINES
Filed April 17, 1961  5 Sheets-Sheet 1

INVENTOR.
Elton B. Fox
BY
His Attorney

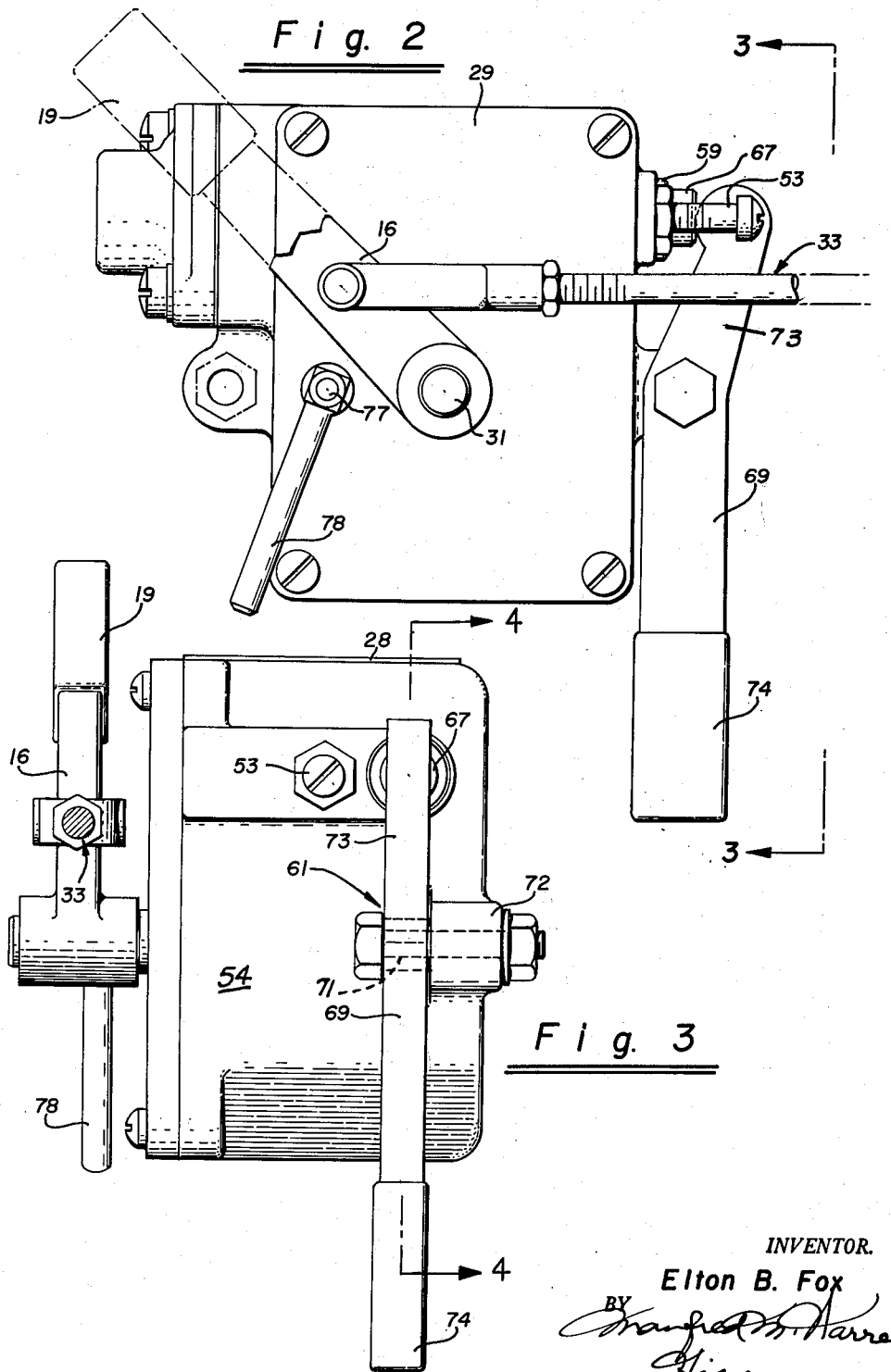

INVENTOR.
Elton B. Fox
BY
Attorney

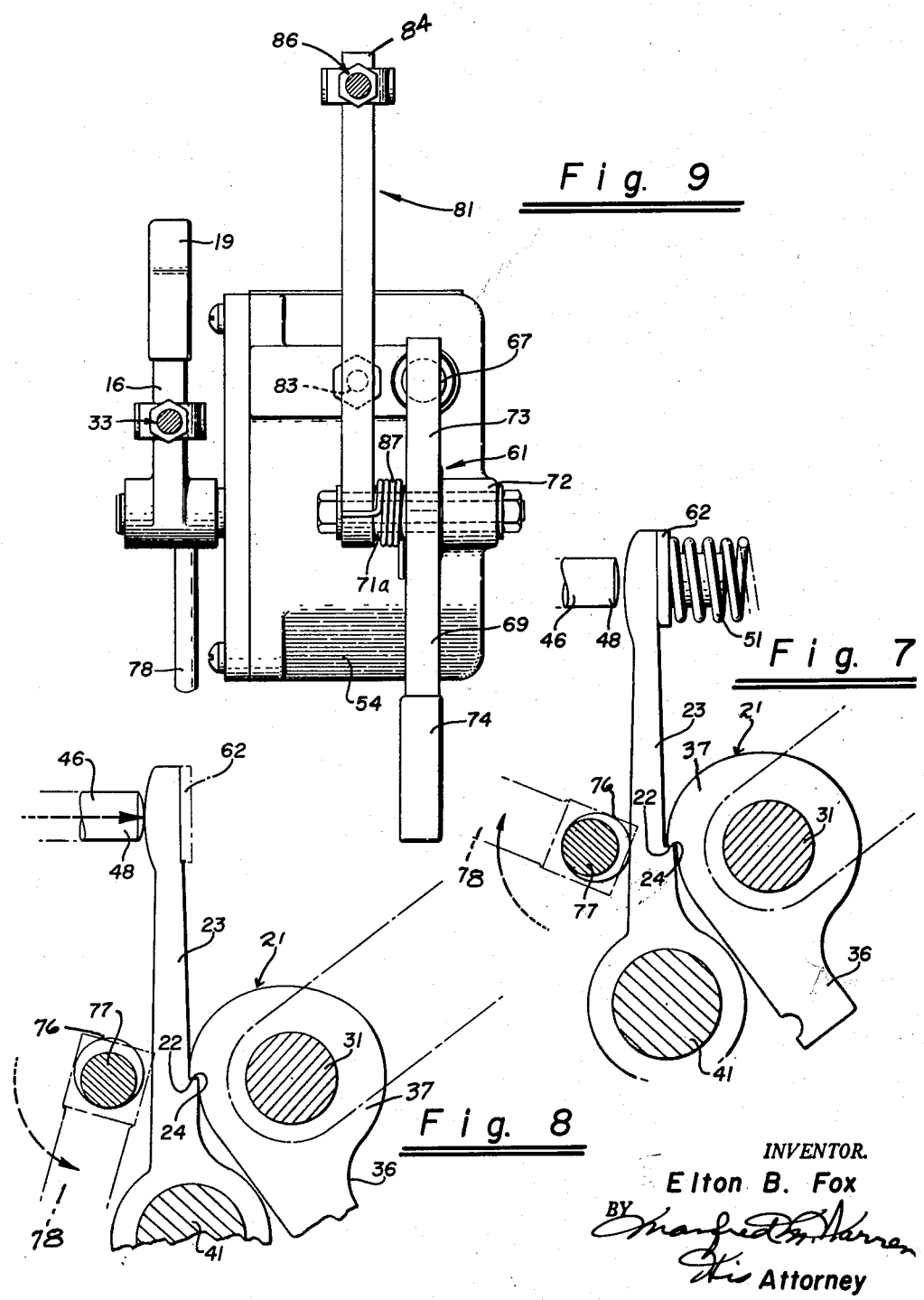

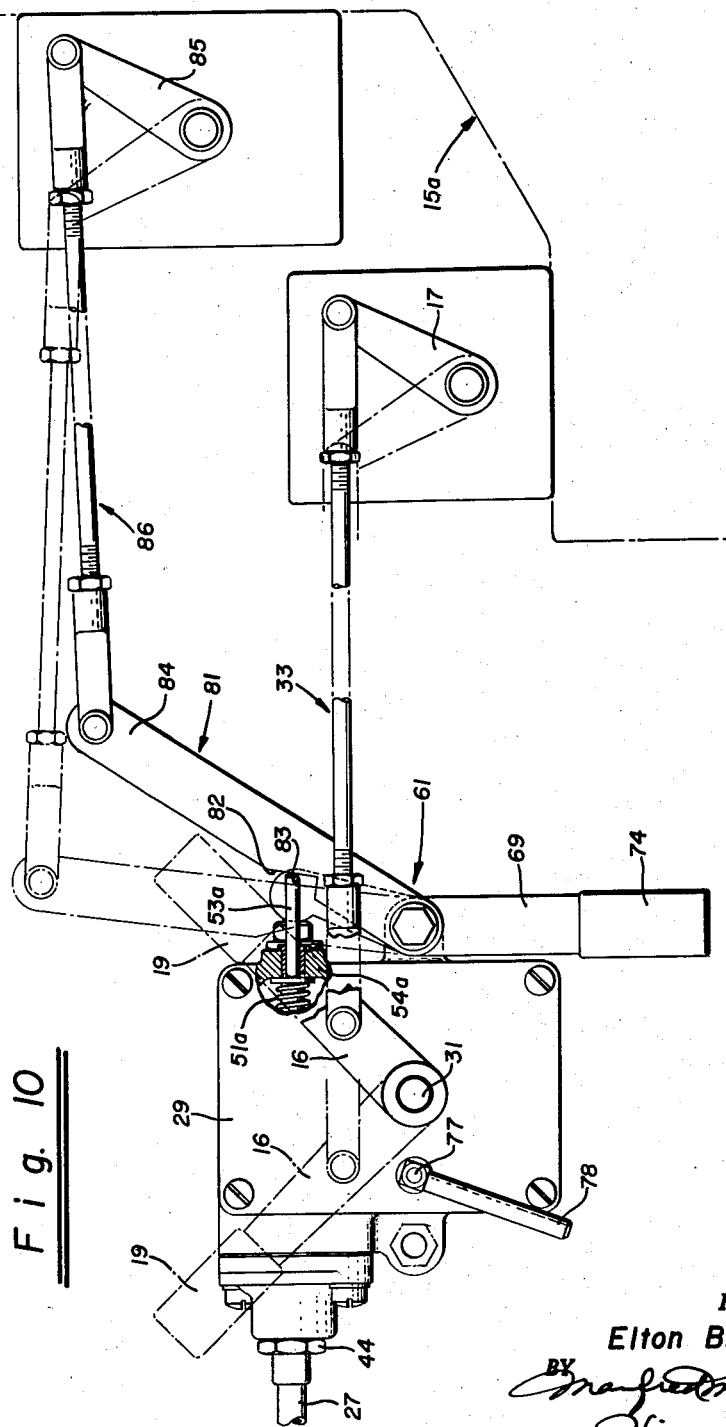

United States Patent Office 3,115,951
Patented Dec. 31, 1963

3,115,951
PRESSURE RESPONSIVE SAFETY CONTROL FOR INTERNAL COMBUSTION ENGINES
Elton B. Fox, 681 36th St., Richmond, Calif.
Filed Apr. 17, 1961, Ser. No. 103,519
5 Claims. (Cl. 185—37)

The invention relates to safety devices and apparatus used in conjunction with an internal combustion engine and functioning to shut down the operation of the engine at the onset of a potentially dangerous engine operation condition such as the loss of oil pressure, etc.

An object of the present invention is to provide a pressure responsive safety control device of the character described which is of relatively simple low cost construction providing an all-mechanical, snap action operation of high reliability and which is composed of a minimum number of ruggedly formed parts designed to afford a long and service-free life for the unit.

Another object of the present invention is to provide a safety control device of the character described which is responsive to a loss of engine oil pressure and which is so constructed that the minimum actuation pressure may be easily and precisely set as a constant or as a function of engine load; the unit also being arranged for use in conjunction with other devices for providing protection of the engine against other potentially dangerous operating conditions such as excessively high heat, vibration or speed.

A further object of the present invention is to provide a pressure responsive safety control of the character above which while functioning automatically to shut down the operation of the engine on the happening of one of the potentially dangerous conditions noted, may nevertheless be manually operated at any time to shut down the engine.

The invention possesses other objects and features of advantage, some of which of the foregoing will be set forth in the following description of the preferred form of the invention which is illustrated in the drawings accompanying and forming part of this specification. It is to be understood, however, that variations in the showing made by the said drawings and description may be adopted within the scope of the invention as set forth in the claims.

Referring to said drawings (five sheets):

FIGURE 2 is a side elevation of the control similar to FIGURE 1 but on a somewhat enlarged scale and showing the control in a shut-off position.

FIGURE 3 is an end elevation of the control.

FIGURE 7 is a fragmentary cross-sectional view on an enlarged scale of certain latch parts used in the control.

FIGURE 8 is a fragmentary cross-sectional view similar to FIGURE 7 but showing the latch parts in another position.

FIGURE 9 is an end elevation of a modified form of control.

FIGURE 10 is a side elevation of the control shown in FIGURE 9, with portions broken away and shown in section, and shown operatively connected to an engine.

Figure 1:
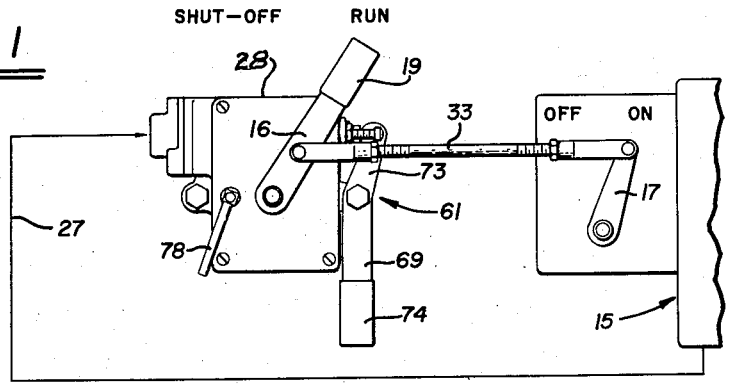
FIGURE 1 is a side elevation of a pressure responsive safety control constructed in accordance with the present invention and shown operatively connected to an internal combustion engine.
Figure 6:
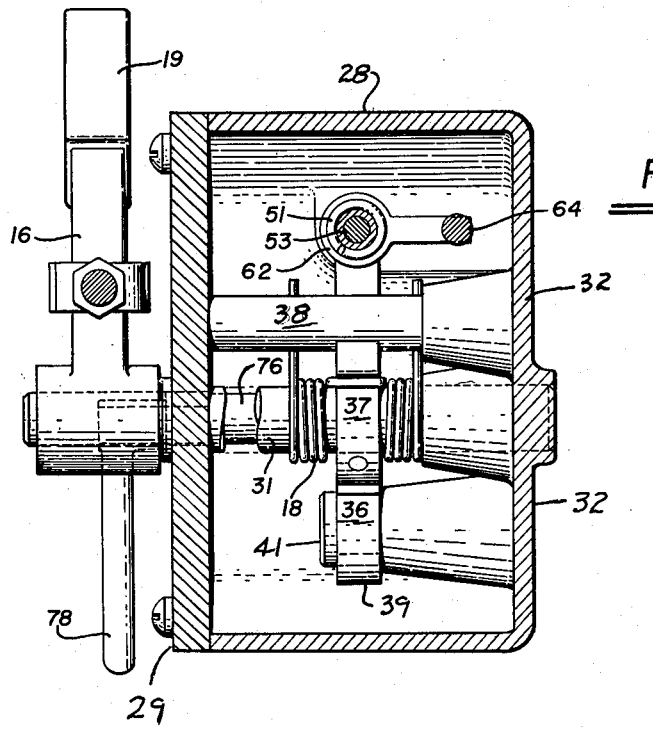
FIGURE 6 is a cross-sectional view of the control taken substantially on the plane of line 6—6 of FIGURE 4.
Figure 4:
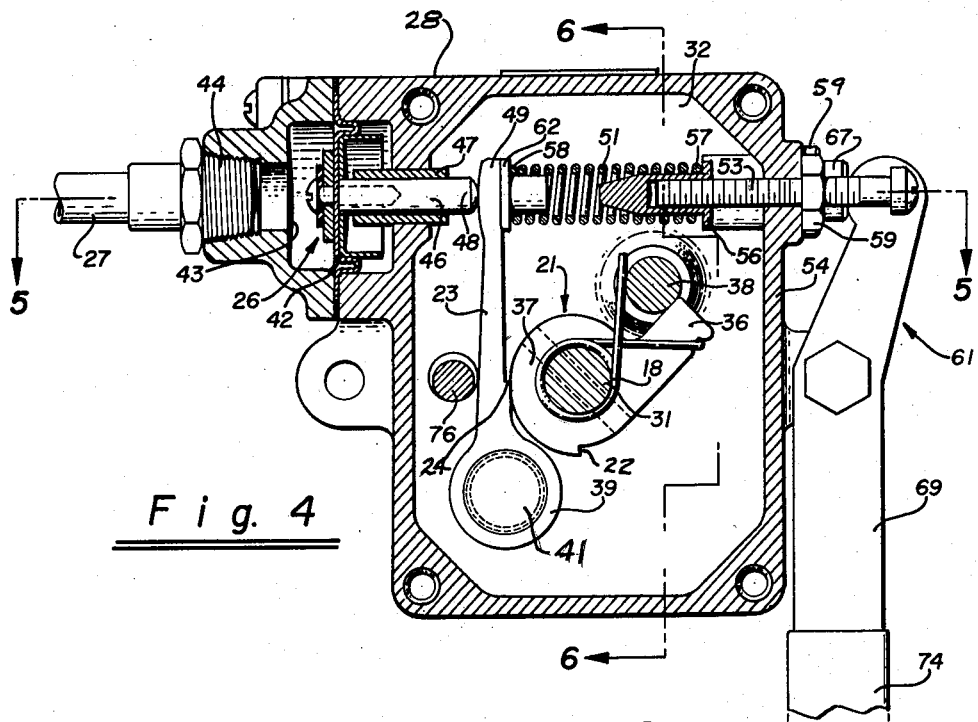
FIGURE 4 is a cross-sectional view of the control taken substantially on the plane of line 4—4 of FIGURE 3.
Figure 5:
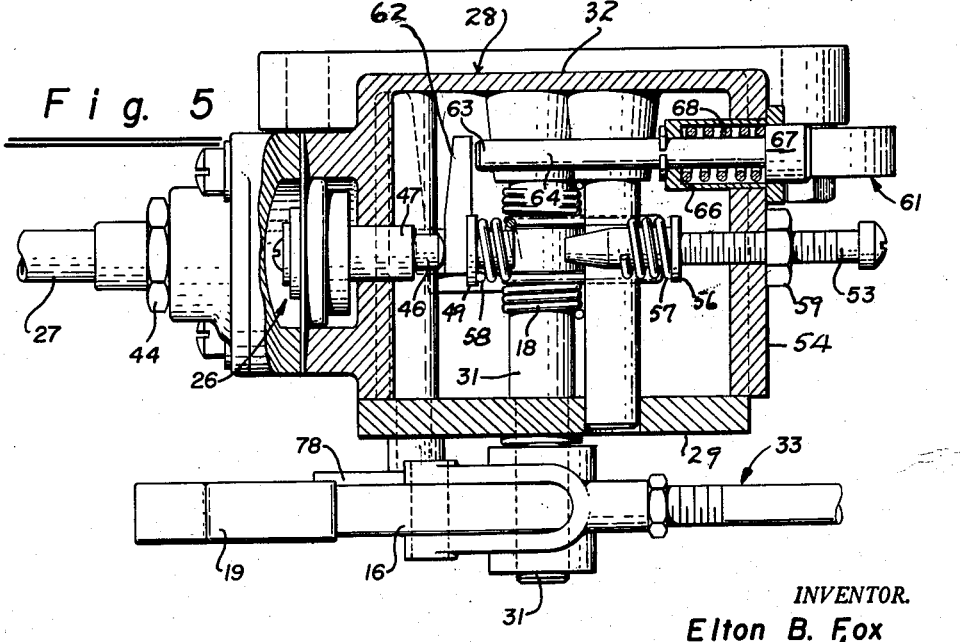
FIGURE 5 is a cross-sectional view of the control taken substantially on the plane of line 5—5 of FIGURE 4.

The pressure responsive safety control of the present invention consists briefly of a first lever 16 adapted for connection to a shut-off device 17 for an internal combustion engine 15, and having rotary displaced positions as indicated in FIGURE 1 as the "run" and "shut-off" positions of the device; a spring 18, see FIGURES 4, 5, and 6, connected to and urging the lever to "shut off" position; the lever being formed with a handle portion 19 for manual engagement and displacement to "run" position against the action of spring 18; means 21, see FIGURES 4, 7 and 8, mounted for rotation with lever 16 and providing a latch shoulder 22; a second lever 23 and pawl 24 carried thereby mounted for oscillation between an advanced position engaging the pawl with the shoulder 22 for holding lever 16 in its "run" position, and a retracted position withdrawing the pawl 24 from shoulder 22 and releasing lever 16 for movement by spring 18 to its "shut-off" position; and pressure responsive means 26 adapted for connection to the oil pressure line 27 of the engine and being connected to move lever 23 to its advanced position when engine oil pressure is present and to a retracted position when engine oil pressure is absent thereby unlatching lever 16 for movement to its "shut-off" position.

The various co-functioning parts as above described are conveniently assembled and housed in and upon a case or housing 28 with lever 16 mounted externally of one side 29 of the case and upon a shaft 31 which is journalled in side 29 and projects through the interior of the case and is journalled in the opposite side 32 of the case. Lever 16 may be connected in any suitable manner to the engine shut-off device 17 depending upon the particular device selected for shutting down the engine. The latter may be the fuel on-off lever of a fuel injection pump, as here illustrated, or may be the air butterfly valve or other part of the engine. In the present instance lever 16 is shown connected to lever 17 by a link 33 which displaces lever 17 to its "on" position when lever 16 is in its "run" position and swings lever 17 to its "off" position when lever 16 is swung to its "shut-off" ""pholine Internally of the case, an arm 36 is fastened to shaft 31 for rotation therewith and is formed with a circular hub portion 37 surrounding the shaft and providing the latching shoulder 22 above noted. Spring 18 is here of helical form surrounding shaft 31 and having end portions connected to arm 36 and an internally mounted stop shaft 38 whereby the shaft is constantly urged in a counter clockwise direction as viewed in FIGURE 4 tending to bring arm 36 into abutment with stop shaft 38 and corresponding with the "shut-off" position of the device. On displacement of lever 16 to its "run" position, shaft 31 is rotated in a clockwise direction, swinging arm 36 away from stop shaft 38 and to the position as illustrated in FIGURE 7.

Lever 23 is formed with a cylindrical bearing portion 39 at its lower end, as viewed in FIGURE 4, and which is journalled on the outer end of a stub shaft 41 projecting out from side 32 of the housing just below and to the left of shaft 31. A needle or roller or ball type bearing is desirably used between lever portion 39 and shaft 41 so as to minimize friction and resistance to movement of lever 23. Lever 23 extends generally upwardly from shaft 41 and is formed with a horizontal step or shoulder at about the horizontal center line of shaft 31 which provides the pawl 24 above described. As will be observed, the shoulder 22, moveable with lever 16, faces downwardly at about the horizontal center plane of shaft 31 when lever 16 is displaced to its "run" position, and shoulder or pawl 24 faces upwardly so as to move in under and support shoulder 22 when lever 23 is rotated to its advanced position as above described. Upon return of lever 23 to its retracted position, however, the supporting pawl 24 is withdrawn from shoulder 22 and the part 21 is released for rotation of the lever 16 and shaft assembly to the "shut-off" position of the lever.

The pressure responsive means 26 here includes a diaphragm 42 mounted in an oil pressure chamber 43 having an inlet fitting 44 adapted for connection to the oil pressure system of the engine. The central portion of the diaphragm is here secured to an axially extending pin 46 mounted for reciprocation in a tubular bearing 47 for guided movement of the opposite end 48 of the pin into engagement with the upper end 49 of lever 23; the arrangement providing for a displacement of lever 23 in a clockwise direction to its advanced position when oil pressure is present in chamber 26 against diaphragm 42. A return biasing spring 51 is mounted against the opposite side of lever end 49 for displacing lever 23 in a counter-clockwise direction and to its retracted position upon loss of oil pressure in chamber 26. As an important feature of the present invention, a variable pre-loading means is provided for spring 51 thereby setting the minimum required oil pressure for holding lever 16 in its latched "run" position. As here shown, this pre-loading means includes a screw member 53 threaded through an end wall 54 of the case, and which carries at its inner end, a spring rest member 56 which supports one end 57 of spring 51, the opposite end 58 of the spring being supported in abutment with the upper end 49 of lever 23. One or more lock nuts 59 may be provided on screw 53 for securing the latter in its adjusted position.

As another feature of the present device, a manually engageable means 61 is connected for manual displacement of lever 23 to its retracted position and against the action of the pressure responsive means 26 whenever it is desirable to manually shut down engine operation. As best shown in FIGURE 5, lever 23 is provided with a side arm 62 in position to be engaged by one end 63 of a pin 64, which is mounted for reciprocation perpendicularly to lever 23 for producing a counter clockwise displacement of the lever. As here shown, pin 64 is slidably mounted for reciprocation in a bushing 66 mounted in end wall 54 of the case 28 and is formed with an enlarged button or head 67 which extends externally of the bushing and wall 54 for manual engagement and displacement. Preferably a spring 68 mounted within the bushing and in compression against head 67 normally urges pin 64 to a retracted position with respect to lever side arm 62. Upon pushing in of head 67, the inner end 63 of pin 64 may be brought into abutment with arm 62 for displacing lever 23 to its "retracted" position against the action of the pressure acting on diaphragm 42. To facilitate this latter movement, a force multiplication lever 69 is conveniently mounted on the end wall 54. This lever is here journalled on a stub shaft 71 carried by an ear or boss 72 formed on a wall 54, the lever having a relatively short upper end portion 73 bearing upon head 67 and a relatively longer lower portion 74 forming a handle for manual engagement and displacement.

As a convenience in starting up the engine with which the control of the present invention is used, there is preferably provided a means for temporarily holding lever 16 in its "run" position until the engine has built up sufficient oil pressure to take over and hold parts in latched position as above explained. As here shown in FIGURES 7 and 8, a manually operable cam means 76 is mounted for engagement with lever 23 and is moveable to and from an operating position displacing lever 23 to its advanced position, the cam means 76 being biased for automatic return movement away from its operative position when the pressure responsive means 26 functions to take over the support of lever 23 as above explained. This cam means is here provided as an eccentric on a cross shaft 77 journalled in the opposed side walls 29 and 32 of the case, the shaft extending transversely to the length of lever 23 medially of its length so that upon rotation of shaft 77, the eccentric cam 76 thereon will move against the adjacent side of lever 23 and force a clockwise rotation of the lever to its "advanced" position. The biasing return means for the cam may either be by spring or gravity operation. The latter is here illustrated. An arm or handle 78 is secured to the end of shaft 77 projecting through wall 29 and is so related to the eccentric cam that a movement of arm 78 to a raised horizontal position will displace lever 23 to its "advanced" latching position. When the support for lever 23 is taken over by the pressure responsive means, a slight additional movement of lever 23 in a clockwise direction releases the pressure on the eccentric cam 76 thereby permitting handle arm 78 to fall to a downward position and automatically removing the temporary support behind lever 23 so that it may subsequently respond to a loss of oil pressure. In this construction the parts are so formed that the advancing of lever 23 by the eccentric cam 76 is sufficient to position pawl 24 under and in supporting relation to shoulder 22, but leaving room for further clockwise displacement of lever 23 to be effected by the pressure responsive means.

A brief description of operation follows: To start up the engine with which the unit of the present invention is used, lever 16 is swung to its "run" position by manual engagement and displacement of handle portion 19. The temporary holding latch handle 78 is then raised to its horizontal position so as to displace lever 23 to its "advanced" position, positioning pawl 24 under and in supporting relation to shoulder 22. This movement of lever 23 is effected against the resistance of spring 51 thereby maintaining pressure on the eccentric cam means and temporarily supporting the handle arm 78 of this means in a raised horizontal position. With lever 16 thus temporarily supported in its "run" position, the engine may be started. As oil pressure increases, diaphragm 42 is displaced to the right as viewed in FIGURE 4, pushing pin 46 against the upper end 49 of lever 23 and a small further clockwise rotation of lever 23 is permitted before it abuts the hub portion 37 of the holding latch means. This slight forward movement of lever 23 removes the pressure on the eccentric cam 76 thereby permitting the latter to rotate under the falling weight of handle 78 and removing the support from the rear side of lever 23 and permitting the latter to move to its "retracted" position upon a subsequent loss of oil pressure. When such loss of oil pressure occurs, spring 51 will displace lever 23 in a counterclockwise direction to its "retracted" position, withdrawing pawl 24 from shoulder 22 and thereby permitting rotary displacement of lever 16 to its "shut-off" position under the action of spring 18. The latch parts are preferably formed of hardened alloy steel so as to provide a long life for the unit.

The pre-loading means 52 for spring 51 may be adjusted to provide tripping pressures of from about 5 to 45 pounds per square inch. A pre-setting to provide a minimum actuation pressure of about 10 pounds per square inch is normally referred. In the modified form of the invention as illustrated in FIGURES 9 and 10, the pre-loading means is operatively connected to a load responsive device of the engine whereby the pre-loading of spring 51a is accomplished as a function of engine load. On many engines the lubricating oil pressure decreases considerably at the reduced speeds. When the engine is running at full speed and full load, it is desirable to have a higher oil tripping pressure on the safety control in order to give proper protection to the engine. If this is done and speed is reduced, the oil pressure decreases and the engine may be accidentally shut down. Lower oil pressure at reduced speeds is normally not harmful but if a heavy load is on the engine and the reduced speed is caused by "lugging" the engine down, then lower oil pressure is harmful, particularly on air cooled engines. In the modified form of the invention the tensioning pin 53a for spring 51a is mounted for reciprocation in wall 54a so as to afford variable pre-loading the the spring and is reciprocated by a lever 81 which is directly attached to the engine load lever 85 so that the tripping pressure is increased according to the increase in loading of the engine load lever. The load lever may be the fuel on-off lever of a fuel injection pump, or the throttle valve of a gasoline engine.

Lever 81 may be conveniently mounted on stub shaft 71a in the plane of pin 53a for movement of a mid portion 82 of the lever against the outer end 83 of pin 51a. The outer end portion 84 of the lever may be connected by links 86 to the engine load lever 85 of the engine 15a so that lever 81 will be swung away from the case so as to reduce the pre-loading on spring 51a under light engine load, and will be swung in a counterclockwise direction as viewed in FIGURE 10 toward the case so as to increase the pre-loading on spring 51a under full load operating conditions of the engine. A return spring 87 is preferably connected to lever 81, as shown in FIGURE 9.

As will be observed, the unit of the present invention will function to shut down the engine whenever there is a loss of oil pressure in chamber 43. Accordingly by using pressure venting or release valves in the line and which are responsive to high temperature, vibration, or speed, the device will protect against other potentially dangerous engine operating conditions such as excessively high water temperature, vibration or speed. Any number of such pressure, temperature, vibration, or speed sensing components may be employed to form a complete safety system. In addition to or as an alternate of shutting down engine operation, lever 16 may be connected to actuate an alarm or warning device.

I claim:

1. A safety control for an internal combustion engine comprising, a first lever having rotary displaced run and shut-off positions, a spring connected to and urging said lever to shut-off position, a handle connected to said lever for manual displacement thereof to run position against the action of said spring, means mounted for rotation with said lever and providing a latch shoulder, a second lever and pawl carried thereby mounted for rotary oscillation between an advanced position engaging said pawl with said shoulder for holding said first lever in run position and a retracted position withdrawing said pawl from said shoulder and releasing said first lever for movement by said spring to shut-off position, a second spring connected to and urging said second lever to retracted position and pressure responsive means connected to move said second lever to advanced position against the action of said second spring.

2. A safety control for an internal combustion engine comprising, a first lever having rotary displaced run and shut-off positions, a spring connected to and urging said lever to shut-off position, a hand connected to said lever for manual displacement thereof to run position against the action of said spring, means mounted for rotation with said lever and providing a latch shoulder, a second lever and pawl carried thereby mounted for rotary oscillation between an advanced position engaging said pawl with said shoulder for holding said first lever in run position and a retracted position withdrawing said pawl from said shoulder and releasing said first lever for movement by said spring to shut-off position, a second spring urging said second lever to retracted position, a pressure responsive actuating member connected to move said second lever to advanced position against the action of said second spring, and means providing variable preloading for said second spring for setting the minimum required pressure for holding said first lever in its latched run position.

3. A safety control for an internal combustion engine comprising, a first lever having rotary displaced run and shut-off positions, a spring connected to and urging said lever to shut-off position, a handle connected to said lever for manual displacement thereof to run position against the action of said spring, means mounted for rotation with said lever and providing a latch shoulder, a second lever and pawl carried thereby mounted for rotary oscillation between an advanced position engaging said pawl wtih said shoulder for holding said first lever in run position and a retracted position withdrawing said pawl from said shoulder and releasing said first lever for movement by said spring to shut-off position, a second spring connected to and urging said second lever to retracted position and pressure responsive means connected to move said second lever to advanced position against the action of said second spring, and manually engageable means connected for manual displacement of said second lever to retracted position against the action of said pressure responsive means.

4. A safety control for an internal combustion engine comprising, a first lever having rotary displaced run and shut-off positions, a spring connected to and urging said lever to shut-off position, a handle connected to said lever for manual displacement thereof to run position against the action of said spring, means mounted for rotation with said lever and providing a latch shoulder, a second lever and pawl carried thereby mounted for rotary oscillation between an advanced position engaging said pawl with said shoulder for holding said first lever in run position and a retracted position withdrawing said pawl from said shoulder and releasing said first lever for movement by said spring to shut-off position, a second spring connected to and urging said second lever to retracted position and pressure responsive means connected to move said second lever to advanced position against the action of said second spring, manually operable cam means mounted for engagement with said second lever and being moveable to and from an operating position displacing said second lever to its advanced position, means biasing said cam means for return movement away from said operating position, said pressure responsive means functioning to take over the support of said second lever in its advanced position when a pre-selected minimum pressure is present and to release sad cam means for return movement by its biasing means.

5. A safety control for an internal combustion engine comprising, a first lever having rotary displaced run and shut-off positions, a spring connected to and urging said lever to shut-off position, a handle connected to said lever for manual displacement thereof to run position against the action of said spring, means mounted for rotation with said lever and providing a latch shoulder, a second lever and pawl carried thereby mounted for rotary oscillation between an advanced position engaging said pawl with said shoulder for holding said first lever in run position and a retracted position withdrawing said pawl from said shoulder and releasing said first lever for movement by said spring to shut-off position, a second spring urging said second lever to retracted position, a pressure responsive actuating member connected to move said second lever to advanced position against the action of said second spring, and means connected to and permitting variable loading of said second spring.

References Cited in the file of this patent

UNITED STATES PATENTS 2,551,429    Eppens _____ May 1, 1951
2,854,964    Wagner _____ Oct. 7, 1958